United States Patent [19]

Boardman, Jr. et al.

[11] 3,901,067

[45] Aug. 26, 1975

[54] SEMICONDUCTOR GAS DETECTOR AND METHOD THEREFOR

[75] Inventors: William W. Boardman, Jr., Whittier; Robert H. Johnson, El Toro, both of Calif.

[73] Assignee: General Monitors, Inc., Costa Mesa, Calif.

[22] Filed: June 21, 1973

[21] Appl. No.: 372,098

[52] U.S. Cl. .................... 73/23; 23/254 E; 338/34

[51] Int. Cl. .................... G01n 27/04

[58] Field of Search .................... 73/23, 27 R; 23/232 E, 23/254 E, 255 E; 324/65 R, 71 SN; 117/212; 338/34; 340/237 R

[56] References Cited

UNITED STATES PATENTS

| | | | |
|---|---|---|---|
| 3,479,257 | 11/1969 | Shaver | 23/254 E X |
| 3,507,145 | 4/1970 | Loh | 73/27 R X |
| 3,532,563 | 10/1970 | Genser | 117/212 X |
| 3,567,383 | 3/1971 | Langley et al. | 73/27 R X |
| 3,714,562 | 1/1973 | McNerney | 73/27 R X |

OTHER PUBLICATIONS

Seiyama et al., "Analytical Chemistry," Study on a Detector Using Semiconductive Thin Films, Vol. 38, No. 8, July 1966, pp. 1069–1073.

*Primary Examiner*—Richard C. Queisser
*Assistant Examiner*—Stephen A. Kreitman

[57] ABSTRACT

Thin film semiconductor articles capable of detecting hydrogen sulfide in an atmosphere at relatively low temperatures. Semiconductor films comprising principally stannic oxide have been found to exhibit substantial decreases in resistance in relatively short times when contacted with as little as 1 ppm of hydrogen sulfide.

10 Claims, 2 Drawing Figures

SEMICONDUCTOR GAS DETECTOR AND METHOD THEREFOR

BACKGROUND OF THE INVENTION

This invention relates to a semiconductor article suitable for use in the detection of hydrogen sulfide gas in the atmosphere and its method of manufacture, and more particularly, to an article a semiconductor film principally comprising stannic oxide.

Because of the high toxicity of hydrogen sulfide, it is important that the presence of the gas be detected at relatively low concentrations in the order of 10 ppm. Although there are a number of analytical devices such as gas chromatagraphs which can accurately measure hydrogen sulfide at low concentrations, such equipment generally does not lend itself to field testing. At oil well and coal mine sites, which are often inaccessible so as to render impractical the transportation of bulky, analytical equipment to such sites, the need for light weight sensors, which can accurately detect the presence of hydrogen sulfide in the atmosphere at relatively low concentrations has become apparent.

The use of semiconductor films which change properties upon exposure to an impurity gas have been investigated for use in light weight sensors. Generally, a change in conductivity of the semiconductor films may be used to monitor impurity gases in the atmosphere. However, it has been found that many semiconductor films exhibit like change in conductivity when exposed to a variety of gases, so that it is impossible to determine the particular gaseous component which has been detected.

Additionally, many semiconductor films, although exhibiting a change in conductivity on exposure to certain gases, are permanently effected by exposure to those gases. Thus, since they will not revert back to their original conductivity upon the purging of the gaseous sample, they can only be used once. The cost of using a sensor only once due to the permanent change in conductivity of the films can become prohibitive.

Also, because of the high toxicity of hydrogen sulfide, it is important that its presence in the atmosphere be detected in a short period of time. Semiconductor films which exhibit changes in conductivity only after relatively long periods of time are not suitable for infield monitoring. Where long times between gas sampling and analysis can be tolerated, then gaseous samples may be transported for laboratory analysis where extremely accurate results may be obtained.

Finally, many semiconductor devices only exhibit detectable changes in physical properties, such as conductivity, when exposed to gases at relatively high temperatures. With such high temperature sensing devices, although it is believed that adsorbtion of the impurity gas into the semiconductor film may contribute to the change in the conductivity, the major cause of conductivity change is often due to a high temperature chemical reaction such as oxidation of the gas onto the semiconductor surface. Sensing devices which require operation at relatively high temperature, in the order of 400°C to 500°C may require relatively bulky heating elements and thermal jackets which do not lend themselves to field monitors. Additionally, sensors which must operate at such elevated temperatures are subject to frequent breakdown and are more expensive to manufacture.

It is an object of this invention to provide a thin film semiconductor article which will readily detect the presence of hydrogen sulfide in the atmosphere at low concentrations, but which is not substantially affected by other gaseous impurities.

It is yet another object of this invention to provide a semiconductor article which will sense the presence of hydrogen sulfide in a relatively short period of time.

It is still another object of this invention to provide an article which may be operated at relatively low temperatures.

It is yet another object of this invention to provide a semiconductor film article which may be used for field monitoring.

SUMMARY OF THE INVENTION

The foregoing and other objects are accomplished according to this invention by provision of a semiconductor film which exhibits a large change in resistance in a short time at relatively low temperatures when exposed to an atmosphere containing hydrogen sulfide, but which is essentially unaffected by other common gaseous impurities.

A semiconductor thin film principally comprising stannic oxide and which may be doped with an impurity atom such as aluminum to increase the rate of change in conductivity. The film is deposited on an inert refractory substrate which preferably, according to one embodiment of the invention, contains heating means for maintaining the film at a constant elevated temperature. In use, the substrate embodies a set of electrodes for measuring the conductivity across the film.

DETAILED DESCRIPTION OF THE INVENTION

Figure 1:
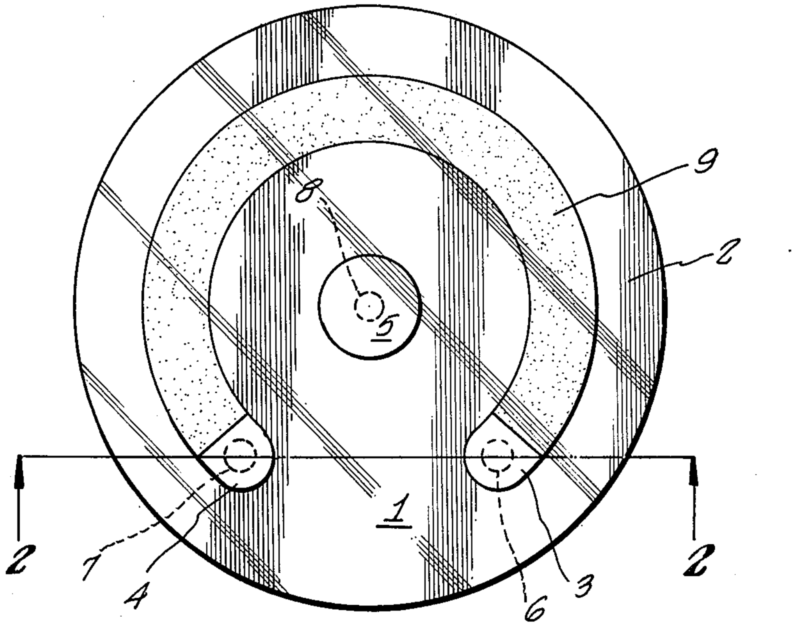
FIG. 1 is a top view of a substrate over which the semiconductor thin film is deposited.
Figure 2:
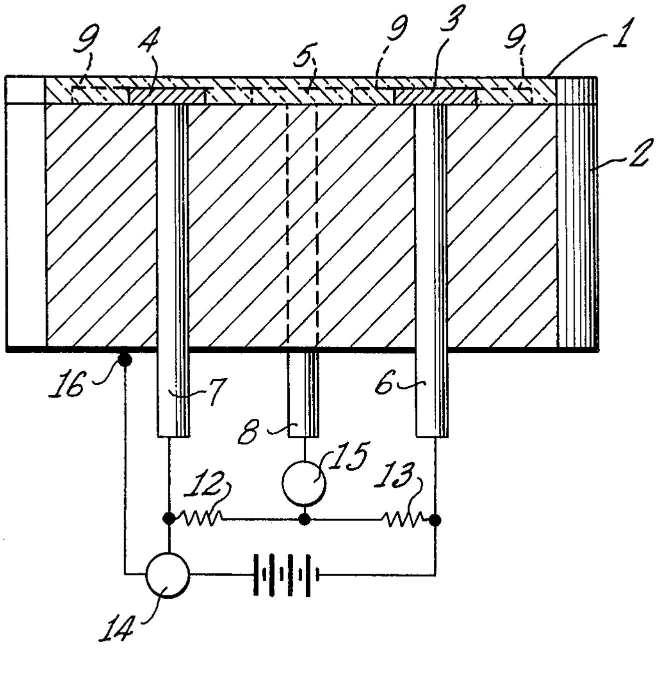
FIG. 2 is a section of the article of FIG. 1 taken along line 2-2 along with an electrical schematic.

Referring to FIGS. 1 and 2, a semiconductor film 1 is deposited on an inert refractory substrate, 2. The substrate may be any suitable material which is stable at temperatures in the range of 130°C and to which the thin film semiconductor will adhere. Suitable materials include ceramics (eg, steatite), glass, quartz, alumina or porcelain. The substrate may embody a set of electrodes 3, 4, 5, for measuring the conductance across the film. The electrodes may be attached via electrode terminals 6, 7, and 8 to a conductivity measuring or sensing device, 15, with resistors 12 and 13 being in series therewith. The electrodes may be made of any suitable material, but perferably a noble metal such as platinum or gold is employed.

Additionally, a resistance heating element, 9, may be provided on the substrate for maintaining the semiconductor film at a constant elevated temperature. The resistance heating element may be controlled by a thermistor, 14, preferably one contacting the substrate as at 16 so it is maintained at a constant temperature. Any suitable heating resistance element may be employed, such as a glass-platinum composite. Conductivity of the semiconductor film is preferably sensed across one or both resistor terminals on the one hand, and the central electrode of the other.

The semiconductor thin film may be deposited onto the substrate by conventional techniques such as evaporation or sputtering, but preferably is deposited by a process involving solution coating, as hereafter described. The coating may be deposited over the entire substrate, including the electrodes and the resistive heating element, or it may be deposited in a predetermined pattern between the inner and outer electrodes by any suitable method, e.g., as evaporation through a mask.

Preferably, a tin salt is deposited over the substrate from a solution. Where dopant atoms are desired, a solution containing a mixture of tin and dopant salts is employed. The coating is then heated in an oxidizing atmosphere to form the stannic oxide thin film semiconductor. Alternatively, albeit less preferably where dopant atoms are required, they may be diffused into a stannic oxide semiconductor film subsequent to its formation.

Dopants which may be employed may include zinc, cadmium, aluminum, gallium, indium, tellurium, arsenic, antimony, bismuth, or palladium. Selection of the type and concentration of dopant will depend upon the initial conductivity of the film desired, the change in conductivity desired after exposures to certain levels of hydrogen sulfide, and the rate of change in conductivity needed. It presently appears that by the use of an aluminum dopant in the stannic oxide film, the resistance of the semiconductor film when measured in a hydrogen sulfide-free atmosphere is greatly increased. This appears to be due to the fact that stannic oxide acts as an n-type semiconductor. By doping it with a group III atom, such as aluminum, the film becomes less n-type, thereby increasing in resistance. However, upon adsorbtion of sulfur atoms from hydrogen sulfide, the thin film again becomes more n-type and therefore more conductive. Although the reason for the change in conductivity upon exposure to hydrogen sulfide is not fully understood, it appears that the hydrogen sulfide, or certain active species thereof, adsorb on the film and release the necessary electrons into the conduction band of the semiconductor to cause the observed increase in conduction.

Suitable aluminum salts which may be employed in combination with the tin salts in the solution coating of the substrate include aluminum nitrate, aluminum trichloride, and aluminum acetate. A non-aqueous polar solvent capable of dissolving the tin and aluminum salts is employed. High boiling alcohols such as glycerin may be used for this purpose.

The thickness of the deposited film may range from 500A to 10,000A depending upon the final property desired. The thinner the film, the lower is the initial conductivity. Also, since the adsorbtion of hydrogen sulfide is substantially a surface phenomenon with a steep diffusion gradient into the film, the thinner the film, the greater the overall change in conductivity upon exposure to $H_2S$. For sensing $H_2S$ at the 100 ppm level, it had been found that a 4,000 A film is adequate to exhibit an increase in conductance of an order of magnitude while for lower hydrogen sulfide levels in the order of 10 ppm, significantly thicker films may be necessary in order to exhibit an order of magnitude change.

PREFERRED MANNER OF SENSOR OPERATION

The hydrogen sulfide sensing device containing the semiconductor apparatus as shown in FIGS. 1 and 2 is heated to an elevated temperature of about 130°C in a hydrogen sulfide-free atmosphere. The resistance across the film is then measured from the inner electrode, 5, to the outer electrodes, 3,4. The sensor is then placed in contact with the gaseous sample to be tested and the conductivity monitored. A final conductivity after approximately 30 minutes exposure to the gaseous atmosphere is taken, and from the change in conductivity, the amount of hydrogen sulfide present is determined. Alternately, through the use of more sophisticated equipment, the rate of change in conductivity as shown in Table I may be measured, thereby giving even faster results.

EXAMPLES

A — Preparation of the Semiconductor Coating

A $SnCl_2$ solution in glycerine was prepared in the following manner.

125 to 135 mg. of anhydrous, reagent grade, stannous chloride powder was mixed into 5.0 ml. of reagent glycerine and gently heated until the solids dissolved. This solution contained about 2 weight percentage of $SnCl_2$.

A compatible solution of $Al(NO_3)_3.9H_2O$ was prepared by mixing 35 to 45 mg. of reagent grade $Al(-NO_3)_3.9H_2O$ and one drop 6 N. $HNO_3$ into 5.0 ml. of reagent quality glycerine and gently heating until the solids went into solution. The solution contained about 0.02 milligram atoms of aluminum per mililiter of solution. 0.1 ml of the aluminum salt solution was mixed with 5.0 ml. of the stannous salt solution by warming and agitation of the mixture. The water content of this solution was approximately 6%.

B — Preparation of the Thin Film Sensor

A steatite disk (approximately 6 m.m. dia.) having deposited thereon a central platinum electrode and an outer electrode of a glass-platinum composition with platinum terminals (substantially as shown in FIGS. 1 and 2) was used as the substrate for deposition of the semiconductor film. The electrodes may be connected to a resistance measuring device for measuring the resistance across the film. Also, the outer electrode may be employed as a resistance heating element and connected to a thermistor so as to maintain the substrate at a constant temperature. The substrate employed was a resistance element like that shown in FIGS. 1–2 obtained from the Helipot Division of Beckman Instruments, Inc., Fullerton, CA and used by Beckman in the manufacture of their 62P potentiometer. Approximately three microliters of the semiconductor coating was dispensed from a glass capillary onto the substrate and spread to cover the entire surface. The substrate was heated from 25°C to 430°C over a 30-minute period to yield approximately a 4000A thick aluminum-doped stannic oxide film.

C — Film Properties

A plurality of films prepared in the above manner were tested for their sensitivity to $H_2S$. Resistance of the films in air maintained at 130°C ranged from $1.7 \times 10^5$ to $2.2 \times 10^4$ ohms/square. Resistance of the films after exposure to 100 ppm of $H_2S$ ranged from $5.5 \times 10^3$ to $3.0 \times 10^3$ ohms/square. Generally, the ratio of the film resistance in air to the film resistance in contact with 100 ppm hydrogen sulfide air mixture was approximately an order of magnitude.

Table I gives a typical response times of such films when exposed to 100 ppm of $H_2S$ at 130°C.

TABLE I

| TIME (Mins) | RESISTANCE (Ohms/sq.) |
|---|---|
| 0 | $5.0 \times 10^4$ |
| 4 | $3.0 \times 10^4$ |
| 8 | $1.0 \times 10^4$ |
| 12 | $9.0 \times 10^3$ |
| 16 | $7.5 \times 10^3$ |
| 20 | $6.0 \times 10^3$ |
| 24 | $5.4 \times 10^3$ |
| 28 | $5.0 \times 10^3$ (max.) |

The change in resistance of a film when exposed to greater concentrations of $H_2S$ will be proportionately higher and resistance will change at a more rapid rate. The time required for the change of an order of magnitude of resistance of a film exposed to 200 ppm $H_2S$ was approximately 10 minutes, while for 1000 ppm $H_2S$, the required time was 2 minutes. Thus, the amount of $H_2S$ may be calculated from the rate of change in resistance of the film or from the final change in resistance.

Table II demonstrates the effect of other impurity gases on the $H_2S$ quantity calculation. It lists the amount of impurity gas necessary to cause ± 1ppm error in the $H_2S$ reading. A (+) error indicates the $H_2S$ reading is higher than the $H_2S$ present, and a (−) reading indicates less than the $H_2S$ present.

TABLE II

| IMPURITY GAS | AMOUNT NECESSARY TO CAUSE 1ppm $H_2S$ ERROR | TYPE ERROR |
|---|---|---|
| $H_2$ | 1,000 ppm | + |
| $SO_2$ | 10,000 ppm | + |
| Methane | No change to 20,000 ppm | |
| Ethane | No change to 20,000 ppm | |
| Butane | No change to 20,000 ppm | |
| Methyl Mercaptan | 10 ppm | + |
| $CS_2$ | 2,000 ppm | − |

By adjusting the semiconductor composition and its thickness, the conductivity of the film and its change in conductivity may be tailored for the amount of $H_2S$ to be detected as well as to the range of resistance reading of which the final sensing device is capable. Generally, for detecting $H_2S$ in the 0 to 100 ppm range, initial resistances of $10^3$ to $10^8$ ohms per square at 130°C are contemplated with final resistances after exposure to $H_2S$ in the range of $10^2$ to $10^4$ ohms per square. We claim:

1. An article comprising a thin film semiconductor coated on an inert, refractory substrate, said film being principally comprised of stannic oxide doped with a dopant selected from the group consisting of zinc, cadmium, aluminum, gallium, indium, tellurium, arsenic, antimony, bismuth or palladium, and diminishing in resistivity with increased atmospheric concentration of hydrogen sulfide when placed about 130°C in an air atmosphere containing at least about 1 ppm hydrogen sulfide.

2. An article according to claim 1 wherein said film is an aluminum doped stannic oxide semiconductor.

3. An article according to claim 2 wherein said film arises from oxidation on said substrate of solution deposited tin and aluminum salts.

4. An article according to claim 2 wherein the resistivity of said film in hydrogen sulfide-free air at about 130°C is within the range (a) from about $10^8$ to about $10^3$ ohms per square and at that same temperature in an air atmosphere containing about 100 ppm hydrogen sulfide within the range (b) from about $10^4$ to about $10^2$ ohms per square, said resistivity decreasing at least about one order of magnitude with hydrogen sulfide concentration increasing from about 0 to about 100 ppm in said atmosphere.

5. An article according to claim 4 wherein said range (a) is from about $5 \times 10^4$ to about $2.0 \times 10^7$ ohms per square and wherein said range (b) is from about $4 \times 10^3$ to about $5 \times 10^4$ ohms per square.

6. An article according to claim 1, said substrate bearing on its surface electrical resistance heating means and, spaced apart therefrom, an electrode, said thin film semiconductor overlying said means and electrode and establishing electrical continuity therebetween, whereupon conductance of said semiconductor film can be determined by measuring current flow between said means and said electrode.

7. An article according to claim 6 wherein said substrate additionally bears temperature sensing means for controlling said resistance heating means to maintain said substrate at a constant temperature elevated with respect to ambient.

8. A method of monitoring the hydrogen sulphide content of a gaseous atmosphere which comprises the steps of:

a. exposing to said atmosphere a thin film semiconductor coated on an inert, refractory substrate said film being principally comprised of a stannic oxide and deminishing in resistivity with increasing atmospheric concentration of hydrogen sulphide when placed at about 130°C in an air atmosphere containing at least about 1 ppm hydrogen sulphide;

b. monitoring the conductivity of said film; and c. generating a signal proportional to the conductivity of said film so monitored.

9. The method of claim 8 wherein the temperature of said film is elevated with respect to ambient.

10. The method of claim 9 wherein said temperature is within the range from about 100°C to about 150°C.

* * * * *